(12) United States Patent
Uno et al.

(10) Patent No.: US 6,692,810 B1
(45) Date of Patent: Feb. 17, 2004

(54) FLAT OPTICAL ELEMENT AND PRODUCTION METHOD THEREFOR

(75) Inventors: Yoshinobu Uno, Kuroishi (JP); Katsumi Takahashi, Kuroishi (JP)

(73) Assignee: Namiki Seimitsu Houseki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/019,665

(22) PCT Filed: Jul. 7, 2000

(86) PCT No.: PCT/JP00/04530
§ 371 (c)(1),
(2), (4) Date: Jan. 2, 2002

(87) PCT Pub. No.: WO01/04686
PCT Pub. Date: Jan. 18, 2001

(30) Foreign Application Priority Data

Jul. 7, 1999 (JP) ............................................ 11/192754

(51) Int. Cl.[7] .................................................. B32B 3/02
(52) U.S. Cl. ...................... 428/81; 428/80; 428/913.3; 156/252
(58) Field of Search ........................ 428/80, 81, 913–3; 372/702; 156/252

(56) References Cited

U.S. PATENT DOCUMENTS 4,125,655 A * 11/1978 Kanzelberger ........... 428/913.3
5,671,881 A    9/1997 Osawa

FOREIGN PATENT DOCUMENTS

| JP | 63-129314 | 6/1988 |
| JP | 07-175019 | 7/1995 |

* cited by examiner

Primary Examiner—Alexander S. Thomas
(74) Attorney, Agent, or Firm—Nixon Peabody LLP; Donald R. Studebaker

(57) ABSTRACT

The purpose is to obtain efficiently, from a large piece of flat optical material, flat optical elements that allow for miniaturization of optical devices because they are octagonal, and that can be fixed securely in the inner opening of permanent magnets by brazing. Rounded openings 11, 12 ... that are circular or elliptical in shape are made at intersections P1, P2 ... of the cut lines C1, C2 ... at which flat optical material 10 is cut vertically and horizontally; the flat optical material 10 in which the openings 11, 12 ... have been made is cut vertically and horizontally; and a number of flat optical elements, each with a nearly octagonal outline with sides that are alternately four straight lines and curves, are obtained.

5 Claims, 4 Drawing Sheets

FLAT OPTICAL ELEMENT AND PRODUCTION METHOD THEREFOR

FIELD OF TECHNOLOGY TO WHICH INVENTION BELONGS

This invention is concerned with improvement of flat optical elements used as Faraday rotators, polarizers and analyzers, and a production method for these optical elements.

BACKGROUND OF INVENTION

Ordinarily, Faraday rotators, polarizers and analyzers are combined as flat optical elements to make up optical devices such as optical isolators, optical regulators, wavelength division multiplexors (WDM), field sensors, optical switches and so on. To improve productivity in the manufacture of these flat optical elements, multiple pieces are obtained by cutting a large piece of optical material that has the characteristics needed for each element.

The flat optical element is made from a large area of flat material which is cut vertically and horizontally, under JPO Kokai Patent S64-79721 (1989), and its shape is square. These square elements do not waste the optical material, all of which is used efficiently.

An optical device constituted by assembling these optical elements has an effective diameter (the device aperture) for incident light and output light, and the flat optical element must be larger than the minimum effective diameter. Therefore, the diagonal measurement of a square element will be 2½ times the minimum effective diameter, and because it is assembled within the inside diameter of a permanent magnet, miniaturization of the optical device is blocked by that structure.

In making up the optical device by assembling these optical elements it is necessary to fix the optical element within the inner diameter of a permanent magnet; fixing with an adhesive or a metal fixture of Au/Sn brazing material. However, because fixing with an adhesive lacks reliability because of such things as deterioration of the adhesive, a metal fixture with brazing material is generally used.

When the four corners are fixed by brazing, the yield of the optical material is liable to drop by reason of cracks which easily form in optical material because there is a difference in the index of thermal expansion of the optical material and the brazing material, and a great difference in area of the fixed portion of one corner and that of the adjacent corner.

Aside from the square elements, there have been proposals such as JPO Patent 2838153 for polygonal flat optical elements with more than 4 sides, such as hexagons or octagons. These shapes are effective for miniaturization of optical devices and for mitigation of the thermal expansion that accompanies brazing.

However, the cutting involved in processing this flat optical material into hexagonal shapes is a time-consuming process, since it is necessary to rotate the large sheet of material repeatedly from 0° to 120°. Moreover, there are more scraps of optical material, and the yield is 60% that of square shapes; the lower yield means higher costs.

Production of octagonal pieces requires a two-step process, first cutting the flat optical material into squares, and then cutting the four corners at a slant. For that reason, the processing is more time-consuming than when hexagonal shapes are processed, and produces more scrap, raising the cost.

The permanent magnets into which the flat optical elements are assembled can be formed with an inner opening that is round, or with a cross-sectional shape that matches the outline of the flat optical element. The octagonal shape has less space between the outline of the element and the inner opening of the permanent magnet, and has the advantage for polarizers and analyzers of a smaller region that does not overlap the beam direction, so that the return beam is blocked fully.

Because of the lesser space between the outline of the element and the inner opening of the permanent magnet, however, the brazing accumulation of these octagonal pieces is inadequate. For this reason, there is the worry of poor fixture of flat optical elements by brazing.

The purpose of this invention is to provide flat optical devices that, because they are nearly octagonal, allow miniaturization of optical devices, and flat optical elements that can be fixed securely within the inner opening of the permanent magnet by brazing.

This invention also has the purpose of providing a method of production of flat optical elements that is capable of efficiently obtaining multiple flat optical elements from a large piece of flat optical material.

OVERVIEW OF INVENTION

The flat optical elements of this invention are formed with nearly octagonal outlines, with sides that are alternately four straight lines and curves.

In the method of producing flat optical elements of this invention, multiple flat optical elements are obtained by making openings that are circular or elliptical in shape at intersections of the cut lines at which the flat optical material is cut vertically and horizontally, cutting the flat optical material in which the openings have been made vertically and horizontally, and obtaining a number of flat optical elements, each with a nearly octagonal outline with sides that are alternately four straight lines and curves.

OPTIMUM MODE OF IMPLEMENTATION

Figure 1:
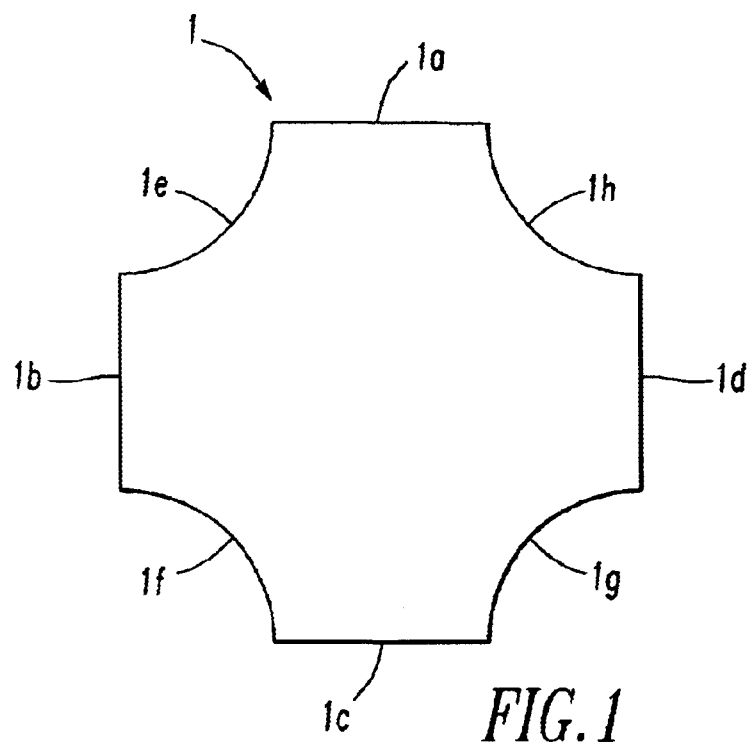
FIG. 1 is a plane view of a flat optical element of one example of this invention.
Figure 2:
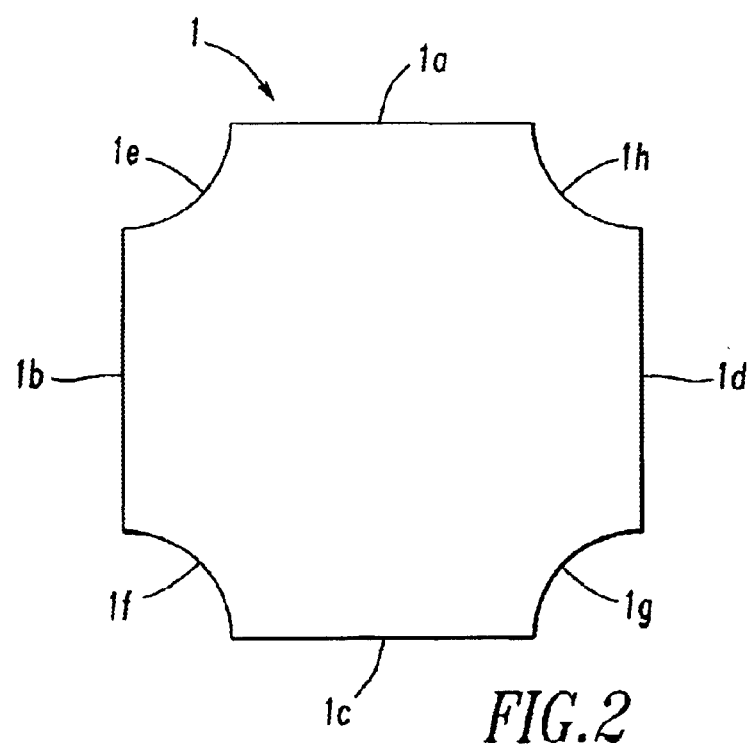
FIG. 2 is a plane view of a flat optical element of another example of this invention.

To explain with reference to the attached drawings, FIGS. 1 and 2 show the optimum shape for constitution of a flat optical element 1 as Faraday rotator, a polarizer or an analyzer. This shape has an outline that is nearly octagonal, with four straight sides 1a to 1d alternating with four curved sides 1e to 1h.

Of these, Faraday Rotators would use as the optical material a sheet of a material such as Faraday glass, magnetic garnet crystal or Cd—Mn—Te—Hg crystal. In the case of polarizers or analyzers, a material which is formed by vapor deposition such as a polarized beam splitter on a base material as birefringent material like polarized glass or rutile-calcite-lithium niobate, would be used as a flat optical material.

Figure 3:
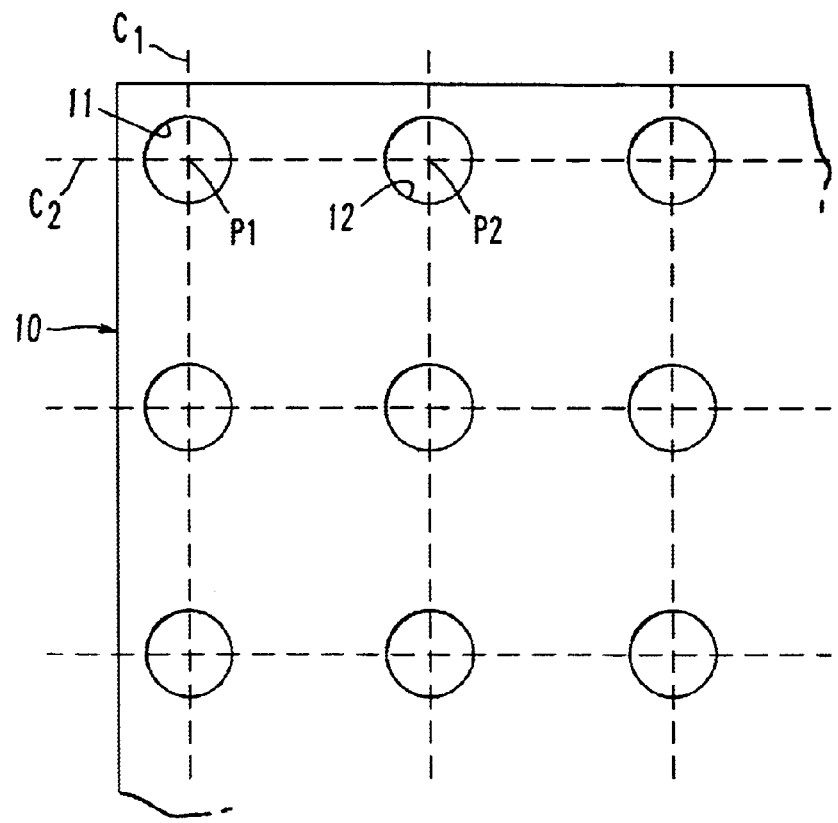
FIG. 3 is an explanatory drawing showing the method of producing the flat optical elements of this invention.

To manufacture these flat optical elements, openings 11, 12 . . . that are rounded in shape are made at intersections P1, P2 . . . of the cut lines C1, C2 . . . at which the flat optical material 10 is cut vertically and horizontally as shown in FIG. 3; the flat optical material 10 in which the openings 11, 12 . . . have been made is cut vertically and horizontally; and a number of flat optical elements, each with a nearly octagonal outline in which straight sides 1a to 1d alternate with curved sides 1e to 1h, are obtained.

Figure 4:
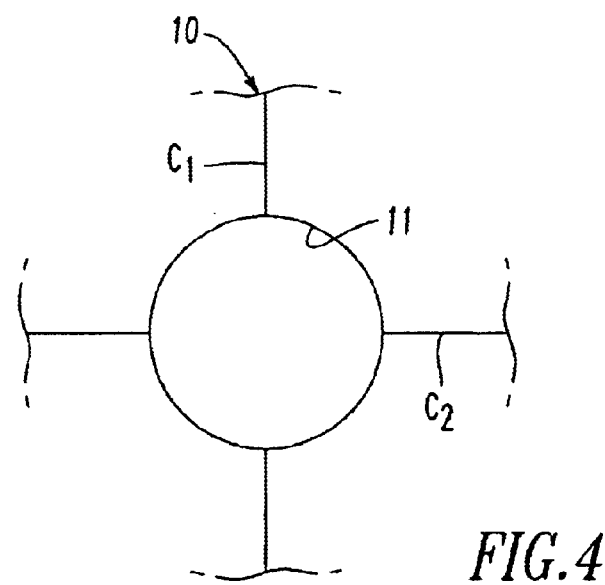
FIG. 4 is a plane view of one example of an opening made in the method of producing flat optical elements of this invention.
Figure 5:
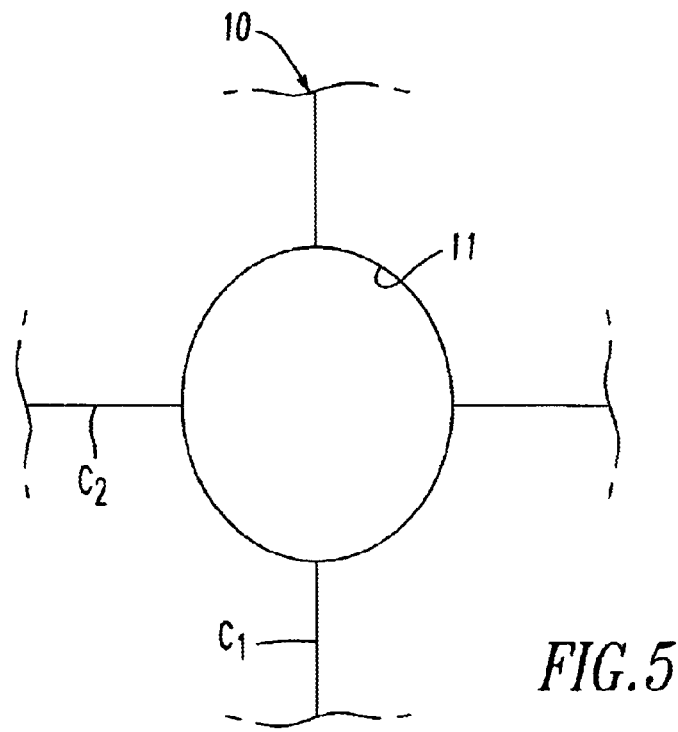
FIG. 5 is a plane view of another example of a rounded opening made in the method of producing flat optical elements of this invention.

The means of cutting the rounded openings 11, 12 . . . (only 11 is labeled in the drawings) can be a diamond drill, laser, ultrasonic waves, etching, or other means as appropriate. The shape of the openings can be either elliptical, as shown in FIG. 4, or circular as shown in FIG. 5. By forming the openings 11, 12 . . . and cutting the surface of the optical material 10 vertically and horizontally, each quarter of a rounded opening 11, 12 . . . corresponds to one curved side 1e to 1h.

These curved sides 1e to 1h are connected at intervals averaging 45°, alternating with straight sides 1a to 1d through 360° as shown in FIG. 1. It is possible, as shown in FIG. 2, to instead have curves 1e to 1h with a smaller radius of curvature, in which their length is equal to or less than that of the straight sides 1a to 1d.

The octagonal shape shown in FIG. 2 is taken as a specific example because of its overall balance. Using garnet single crystal as the base material for Faraday rotators, or polarized glass as the base material for polarizers or analyzers, a diamond drill with a drill diameter of 0.8 mm was used to make circular openings at intervals of 2 mm vertically and horizontally. Because of the 2 mm vertical and horizontal spacing, it was possible to obtain Faraday rotators, polarizers or analyzers measuring 2 mm vertically and horizontally with the corners R 0.8 mm, effective diameter Φ 1.7 mm.

In addition, using garnet single crystal as the base material for Faraday rotators, or glass substrate formed with a polarized beam splitter by vapor deposition as the base material for polarizers or analyzers, a laser with a laser diameter of 0.6 mm was used to make circular openings at intervals of 1.5 mm vertically and horizontally. Because of the 1.5 mm vertical and horizontal spacing, it was possible to obtain Faraday rotators, polarizers or analyzers measuring 1.5 mm vertically and horizontally with the corners R 0.6 mm, effective diameter Φ 1.3 mm.

When nearly octagonal flat optical elements are produced in this way, it is possible not only to build smaller optical devices because of the octagonal shape, but also to obtain multiple flat optical elements at one time by cutting multiple openings in a large sheet of optical material, and making vertical and horizontal cuts. Considered comprehensively, therefore, it is possible to reduce costs and obtain flat optical elements with which optical devices can be built inexpensively.

Figure 6:
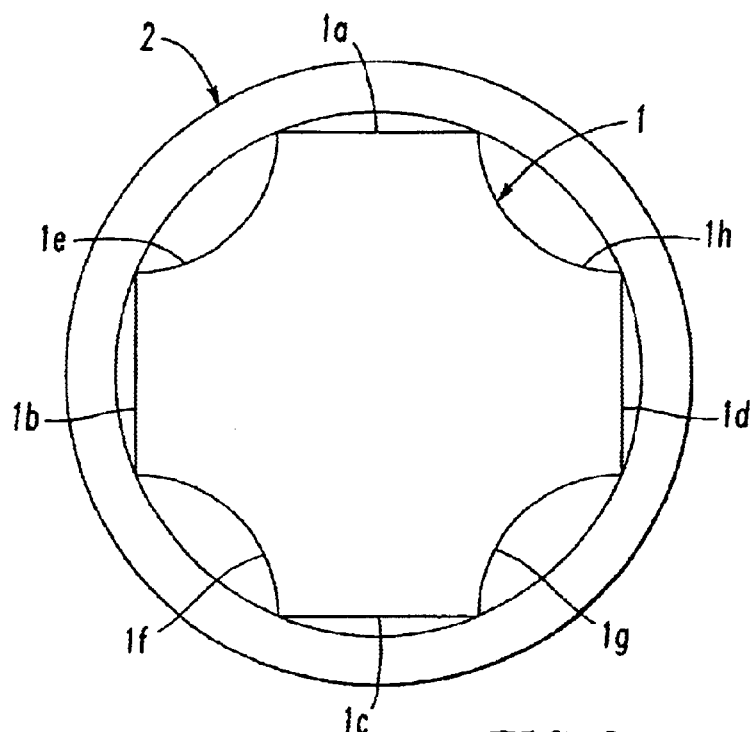
FIG. 6 is an explanatory drawing showing one example of assembling the flat optical element of this invention in a permanent magnet.
Figure 7:
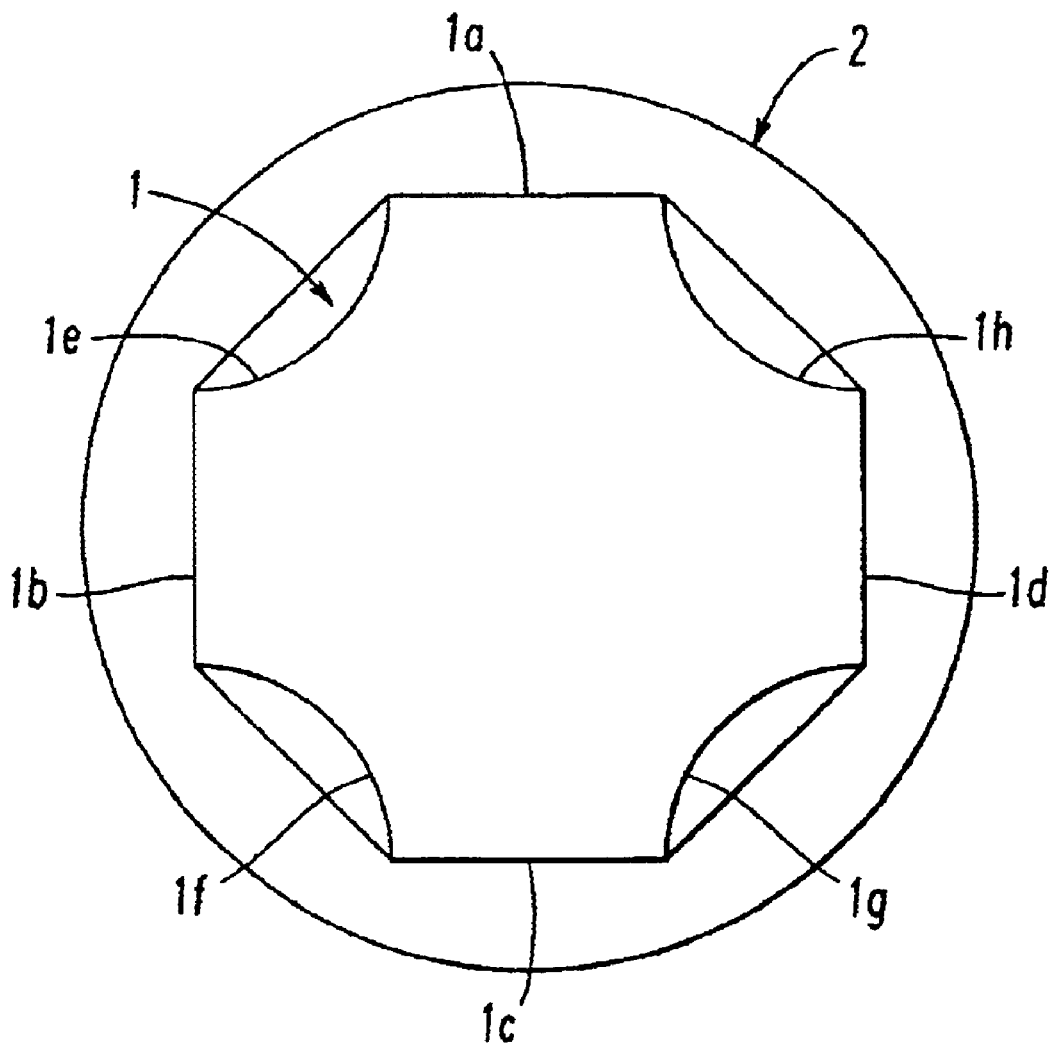
FIG. 7 is an explanatory drawing showing another example of assembling the flat optical element of this invention in a permanent magnet.

When these flat optical elements 1 are fixed inside permanent magnets 2, whether the inside shape of the permanent magnet is rounded as shown in FIG. 6 or octagonal as shown in FIG. 7, there are relatively large gaps between the inside shape of the permanent magnet 2 and the curved sides 1e to 1h of the nearly octagonal flat optical element 1.

Because it is possible to use these gaps to accommodate brazing material, it is possible to fix the flat optical element 1 firmly within the inside shape of the permanent magnet 2.

The brazing strength for octagonal pieces is about 1600 g/mm² for the usual bottom surface brazing, but under this invention it can be over 2200 g/mm², because side surface brazing occurs as well.

INDUSTRIAL UTILITY

As stated above, using the flat optical elements of this invention, it is possible to build highly reliable optical devices in which the flat optical elements are fixed firmly within the inner shape of the permanent magnet, since the outline of the flat optical element is nearly octagonal, with alternating straight sides and curved sides, such that there are relatively large gaps that can accommodate brazing material between the curved sides of the nearly octagonal shape and the inner shape of the permanent magnet.

Using the method of producing flat optical elements of this invention, openings that are circular or elliptical in shape are made at intersections of the cut lines at which the flat optical material is cut vertically and horizontally, the flat optical material in which the openings have been made is cut vertically and horizontally, and a number of flat optical elements, each with a nearly octagonal outline with sides that are alternately four straight lines and curves, are obtained, so that it is possible not only to use the flat optical elements in optical devices that are smaller, but also to obtain multiple flat optical elements at one time by cutting multiple openings in a large sheet of optical material, and making vertical and horizontal cuts, making it possible to reduce costs and build optical devices inexpensively.

The terms and expressions used in the description of the invention above are used simply for the purpose of explanation, and in no way limit the content of this invention. The use of any limiting terms or expressions is not intended to exclude an modality that is equivalent to the invention as described above, or any portion thereof. It is clear, therefore, that it is possible to make various changes within the scope of this invention for which rights are claimed.

What is claimed is:

1. Flat optical elements used as Faraday rotators, polarizers or analyzers, in which each optical element has a nearly octagonal outline with sides that are alternately four straight lines and curves, wherein the radius of curvature of each curve is substantially equal to the length of each straight line.

2. A method of producing flat optical elements that are suited to obtaining, from a large piece of flat optical material, multiple flat elements that are nearly octagonal and can be used as Faraday rotators, polarizers or analyzers; in which openings that are circular or elliptical in shape are made at intersections of cut lines at which the flat optical material is cut vertically and horizontally; the flat optical material in which the openings have been made is cut vertically and horizontally; and a number of flat optical elements, each with a nearly octagonal outline with sides that are alternately four straight lines and curves, are obtained.

3. A method of producing multiple flat optical elements, comprising:

providing a single piece of flat optical material;

making openings in the single piece of flat optical material, located at intersections of vertical and horizontal cut lines; and cutting, along the horizontal and vertical cut lines to obtain multiple flat optical elements that are shaped substantially octagonal.

4. The method of claim 3, wherein the openings are circular or elliptical.

5. The method of claim 3, wherein the radius of curvature of each curve is substantially equal to the length of each straight line.

* * * * *